(12) United States Patent
Oota et al.

(10) Patent No.: US 10,195,824 B2
(45) Date of Patent: Feb. 5, 2019

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuusuke Oota, Shiga (JP); Yasuyuki Izu, Shiga (JP); Daisuke Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 32 days.

(21) Appl. No.: 15/316,274

(22) PCT Filed: Aug. 3, 2015

(86) PCT No.: PCT/JP2015/072003
§ 371 (c)(1),
(2) Date: Dec. 5, 2016

(87) PCT Pub. No.: WO2016/017824
PCT Pub. Date: Feb. 4, 2016

(65) Prior Publication Data
US 2017/0197381 A1    Jul. 13, 2017

(30) Foreign Application Priority Data
Aug. 1, 2014    (JP) ................. 2014-158223

(51) Int. Cl.
*C08K 5/3437* (2006.01)
*C08K 5/56* (2006.01)
(Continued)

(52) U.S. Cl.
CPC ........ *B32B 17/06* (2013.01); *B32B 17/10568* (2013.01); *B32B 17/10669* (2013.01);
(Continued)

(58) Field of Classification Search
CPC ........ B32B 17/10669; B32B 17/10761; C09D 129/14
See application file for complete search history.

(56) References Cited

U.S. PATENT DOCUMENTS

| 2007/0009714 A1 | 1/2007 | Lee et al. |
| 2009/0202844 A1 | 8/2009 | Takagi et al. |

(Continued)

FOREIGN PATENT DOCUMENTS

| JP | 4-502525 | 5/1992 |
| JP | 2014-024312 | 2/2014 |

(Continued)

OTHER PUBLICATIONS

Extended European Search Report dated Feb. 5, 2018 in European Patent Application No. 15 82 6313.
(Continued)

*Primary Examiner* — Ramsey Zacharia
(74) *Attorney, Agent, or Firm* — Wenderoth, Lind & Ponack, L.L.P.

(57) ABSTRACT

The present invention aims to provide an interlayer film for laminated glass capable of displaying images with a high luminous intensity when irradiated with a light beam and having excellent durability, and a laminated glass including the interlayer film for laminated glass. The present invention relates to an interlayer film for laminated glass, including a light-emitting layer that contains a polyvinyl acetal resin and a lanthanoid complex as light-emitting particles, the light-emitting layer containing not more than 100 ppm in total of a nitric acid-derived component and a carbonate component.

2 Claims, 1 Drawing Sheet

(51) Int. Cl.
  *C09J 129/14* (2006.01)
  *B32B 17/10* (2006.01)
  *B32B 17/06* (2006.01)
  *B32B 27/18* (2006.01)

(52) U.S. Cl.
  CPC .. *B32B 17/10688* (2013.01); *B32B 17/10761* (2013.01); *B32B 27/18* (2013.01); *B32B 2307/412* (2013.01); *B32B 2329/06* (2013.01); *B32B 2331/04* (2013.01); *C08K 5/3437* (2013.01); *C08K 5/56* (2013.01); *C09J 129/14* (2013.01)

(56) References Cited

U.S. PATENT DOCUMENTS

| | | | |
|---|---|---|---|
| 2013/0074910 A1* | 3/2013 | Isoue | B32B 17/10036 136/251 |
| 2014/0355106 A1 | 12/2014 | Laluet et al. | |
| 2015/0251385 A1 | 9/2015 | Oota et al. | |
| 2015/0280037 A1* | 10/2015 | Kataoka | B32B 17/10018 136/257 |
| 2016/0214353 A1 | 7/2016 | Oowashi et al. | |

FOREIGN PATENT DOCUMENTS

| | | |
|---|---|---|
| JP | 5503089 | 5/2014 |
| JP | 2015-147725 | 8/2015 |
| WO | 91/06031 | 5/1991 |
| WO | 2013/093351 | 6/2013 |
| WO | 2014/051139 | 4/2014 |
| WO | 2015/046541 | 4/2015 |

OTHER PUBLICATIONS

International Preliminary Report on Patentability dated Feb. 7, 2017 in corresponding International (PCT) Application No. PCT/JP2015/072003.

International Search Report dated Nov. 2, 2015 in corresponding International (PCT) Application No. PCT/JP2015/072003.

* cited by examiner

INTERMEDIATE FILM FOR LAMINATED GLASS, AND LAMINATED GLASS

TECHNICAL FIELD

The present invention relates to an interlayer film for laminated glass capable of displaying images with a high luminous intensity when irradiated with a light beam and having excellent durability, and a laminated glass including the interlayer film for laminated glass.

BACKGROUND ART

Laminated glass is less likely to scatter even when shattered by external impact and can be safely used. Due to this advantage, laminated glass has been widely used, for example, in front, side, and rear windshields of vehicles including automobiles and windowpanes of aircraft, buildings, or the like. A known example of laminated glass is a type of laminated glass including at least a pair of glass plates integrated through, for example, an interlayer film for laminated glass which contains a liquid plasticizer and a polyvinyl acetal resin.

A recent growing need is the development of a head-up display (HUD) which presents meters showing vehicle driving data (e.g. driving speed information) within a usual range of vision in the front windshield of a vehicle.

Various types of HUDs are known. The most typical one is a HUD designed such that a display unit of an instrumental panel projects information (e.g. driving speed information) sent from a control unit onto a front windshield to enable a driver to view the information at a usual viewpoint, namely, within a usual range of vision in the front windshield.

An example of interlayer films for laminated glass for a HUD is an interlayer film for laminated glass having a wedge shape with a predetermined wedge angle proposed in Patent Literature 1. This interlayer film can solve a HUD's drawback that a meter image displayed on a laminated glass appears double.

Patent Literature 1 also discloses a laminated glass which is partially free from the HUD's drawback of double meter image phenomenon. Yet, not the entire face of the laminated glass is free from the double meter image problem.

The applicant of this application discloses in Patent Literature 2 an interlayer film for laminated glass, including a light-emitting layer that contains a binder resin and at least one light-emitting material selected from the group consisting of a light-emitting powder, a luminescent pigment, and a luminescent dye. The light-emitting material such as a light-emitting powder, a luminescent pigment, a luminescent dye, or the like emits light when it is irradiated with light having specific wavelengths. When an interlayer film for laminated glass including such a light-emitting material is irradiated with light, light-emitting particles contained in the interlayer film emit light, thereby displaying high contrast images.

CITATION LIST

Patent Literature

Patent Literature 1: JP H4-502525 T
Patent Literature 2: JP 2014-24312 A

SUMMARY OF INVENTION

Technical Problem

For producing a light-emitting sheet which contains light-emitting materials and can display higher contrast images, it is important to use a light-emitting material having higher light emission intensity. As a result of intensive studies, the present inventors found that lanthanoid complexes show extremely high light emission intensity.

Unfortunately, an interlayer film for laminated glass produced using a lanthanoid complex has a problem in the durability. Specifically, the light emission intensity of such a film decreases when it is exposed to ultraviolet rays for a long period of time.

In view of the current state of the art described above, the present invention aims to provide an interlayer film for laminated glass capable of displaying images with a high luminous intensity when irradiated with a light beam and having excellent durability, and a laminated glass including the interlayer film for laminated glass.

Solution to Problem

The interlayer film for laminated glass of the present invention includes a light-emitting layer containing a polyvinyl acetal resin and a lanthanoid complex as light-emitting particles, the light-emitting layer containing not more than 100 ppm in total of a nitric acid-derived component and a carbonate component.

The present invention will be described in detail below.

The present inventors investigated the cause of the reduction in the durability of interlayer films for laminated glass produced using a lanthanoid complex. They have found that nitric acid-derived components and carbonate components in interlayer films for laminated glass cause the problem.

Interlayer films for laminated glass contain nitric acid-derived components and carbonate components derived from materials such as a neutralizer used in the preparation of a thermoplastic resin. When a lanthanoid complex is added to produce such interlayer films for laminated glass, supposedly the lanthanoid complex interacts with nitric acid-derived components and carbonate components so that the durability of the lanthanoid complex decreases.

As a result of further intensive investigations, the present inventors have found that a reduction in the durability of interlayer films for laminated glass containing a lanthanoid complex can be avoided by controlling the total amount of nitric acid-derived components and carbonate components to a certain amount or less, thereby completing the present invention.

The interlayer film for laminated glass of the present invention includes a light-emitting layer containing a thermoplastic resin and a lanthanoid complex. Due to the lanthanoid complex, the interlayer film can display high contrast images when the light-emitting layer is irradiated with a light beam.

Any thermoplastic resin may be used, and examples thereof include polyvinyl acetal resins, ethylene-vinyl acetate copolymer resins, ethylene-acrylic copolymer resins, polyurethane resins, polyurethane resins including sulfur, polyvinyl alcohol resins, vinyl chloride resins, and polyethylene terephthalate resins. Suitable among these are polyvinyl acetal resins because when a polyvinyl acetal resin is used with a plasticizer, the resulting interlayer film for laminated glass has excellent adhesion to glass.

The polyvinyl acetal is not particularly limited as long as it is obtained by acetalization of a polyvinyl alcohol with an aldehyde. Preferred is polyvinyl butyral. Two or more types of polyvinyl acetal may be used as needed.

As for the degree of acetalization of the polyvinyl acetal, the lower limit is preferably 40 mol %, more preferably 60 mol %, and the upper limit is preferably 85 mol %, more preferably 75 mol %.

As for the hydroxy group content of the polyvinyl acetal, the preferable lower limit is 15 mol %, and the preferable upper limit is 35 mol %. When the hydroxy group content is 15 mol % or more, formation of the interlayer film for laminated glass is facilitated. When the hydroxy group content is 35 mol % or less, the interlayer film for laminated glass is easy to handle.

The degree of acetalization and the hydroxy group content can be measured in accordance with, for example, "Testing method for polyvinyl butyral" in JIS K 6728.

The polyvinyl acetal can be prepared by acetalization of a polyvinyl alcohol with an aldehyde. The polyvinyl alcohol is typically prepared by saponification of polyvinyl acetate. Usually, a polyvinyl alcohol having a degree of saponification of 70 to 99.8 mol % is used.

As for the degree of polymerization of the polyvinyl alcohol, the preferable lower limit is 500, and the preferable upper limit is 4000. A polyvinyl alcohol with a degree of polymerization of 500 or more imparts penetration resistance to a laminated glass to be formed. When a polyvinyl alcohol with a degree of polymerization of 4000 or less is used, formation of the interlayer film for laminated glass is facilitated. The more preferable lower limit of the degree of polymerization of the polyvinyl alcohol is 1000, and the more preferable upper limit is 3600.

The aldehyde is not particularly limited. Usually, a C1-C10 aldehyde is suitably used. Any C1-C10 aldehyde can be used, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. Any of these aldehydes may be used alone, or two or more of them may be used in combination.

As used herein, examples of the lanthanoid include lanthanum, cerium, praseodymium, neodymium, promethium, samarium, europium, gadolinium, terbium, dysprosium, holmium, erbium, thulium, ytterbium, and lutetium. For higher light emission intensity, the lanthanoid is preferably neodymium, europium, or terbium, more preferably europium or terbium, still more preferably europium.

Examples of the lanthanoid complex include lanthanoid complexes with a monodentate, bidentate, tridentate, or tetradentate ligand containing a hydrogen atom, a deuterium atom, a halogen atom, a C1-C20 alkyl group, a nitro group, a hydroxy group, an amino group, a sulfonyl group, a cyano group, a phosphonate group, a phosphate group, or a diazo group.

Particularly preferred are a lanthanoid complex with a bidentate ligand containing a halogen atom or a lanthanoid complex with a tridentate ligand containing a halogen atom. Since such a lanthanoid complex emits light having a wavelength of 580 to 780 nm at an extremely high intensity when irradiated with light having a wavelength of 300 to 410 nm, an interlayer film for laminated glass produced using the lanthanoid complex can display high contrast images.

Examples of the lanthanoid complex with a bidentate ligand containing a halogen atom include tris(trifluoroacetylacetone)phenanthroline europium, tris(trifluoroacetylacetone)diphenyl phenanthroline europium, tris(hexafluoroacetylacetone)diphenyl phenanthroline europium, tris(hexafluoroacetylacetone)bis(triphenylphosphine) europium, tris(trifluoroacetylacetone)2,2'-bipyridine europium, and tris(hexafluoroacetylacetone)2,2'-bipyridine europium.

Examples of the lanthanoid complex with a tridentate ligand containing a halogen atom include terpyridine trifluoroacetylacetone europium and terpyridine hexafluoroacetylacetone europium.

Examples of the halogen atom in the lanthanoid complex with a bidentate ligand containing a halogen atom or lanthanoid complex with a tridentate ligand containing a halogen atom include a fluorine atom, a chlorine atom, a bromine atom, and an iodine atom. Preferred is a fluorine atom for better stability of the ligand structure.

The lanthanoid complex with a bidentate ligand containing a halogen atom or the lanthanoid complex with a tridentate ligand containing a halogen atom is preferably a lanthanoid complex with a bidentate ligand containing a halogen atom and having an acetylacetone skeleton because of its excellent initial light-emitting properties.

Examples of the lanthanoid complex with a bidentate ligand containing a halogen atom and having an acetylacetone skeleton include Eu(TFA)$_3$phen, Eu(TFA)$_3$dpphen, Eu(HFA)$_3$phen, [Eu(FOD)$_3$]bpy, [Eu(TFA)$_3$]tmphen, and [Eu(FOD)$_3$]phen. The structures of these lanthanoid complexes with a bidentate ligand containing a halogen atom and having an acetylacetone skeleton are shown below.

Eu(TFA)$_3$phen

[Eu(FOD)$_3$]bpy

Eu(TFA)$_3$dpphen

[Eu(TFA)₃]tmphen

Eu(HFA)₃phen

[Eu(FOD)₃]phen

The lanthanoid complex is preferably in the form of particles. The lanthanoid complex in the form of particles can be readily dispersed in an interlayer film for laminated glass.

In the case of a lanthanoid complex in the form of particles, the lower limit of the average particle size is preferably 0.01 μm, more preferably 0.03 μm, and the upper limit is preferably 10 μm, more preferably 1 μm.

As for the amount of the lanthanoid complex in the light-emitting layer relative to 100 parts by weight of the thermoplastic resin, the lower limit is preferably 0.001 parts by weight, and the upper limit is 10 parts by weight. When the amount of the lanthanoid complex is 0.001 parts by weight or more, images with a much higher contrast can be displayed. When the amount of the lanthanoid complex is 10 parts by weight or less, an interlayer film for laminated glass with a higher transparency can be obtained. The lower limit of the amount of the lanthanoid complex is more preferably 0.01 parts by weight, still more preferably 0.05 parts by weight, particularly preferably 0.2 parts by weight, and the upper limit is more preferably 5 parts by weight, still more preferably 1 part by weight.

The light-emitting layer contains not more than 100 ppm in total of a nitric acid-derived component and a carbonate component. When the total amount of a nitric acid-derived component and a carbonate component is not more than 100 ppm, the durability of the lanthanoid complex contained therewith can be prevented from decreasing. The light-emitting layer contains preferably not more than 60 ppm, more preferably not more than 50 ppm in total of a nitric acid-derived component and a carbonate component.

The nitric acid-derived component herein refers to $NO_3$ containing one nitrogen atom and three oxygen atoms. The carbonate component herein refers to $CO_3$ containing one carbon atom and three oxygen atoms.

The amounts of a nitric acid-derived component and a carbonate component in the light-emitting layer can be measured by ion chromatography.

The interlayer film for laminated glass contains a nitric acid-derived component or a carbonate component derived from the raw materials of a neutralizer or the like used in the production of a thermoplastic resin. The total amount of a nitric acid-derived component and a carbonate component in the light-emitting layer is controlled to be not more than 100 ppm preferably by washing the thermoplastic resin several times with an excess amount of ion exchange water. In particular, the total amount of a nitric acid-derived component and a carbonate component in the light-emitting layer can be controlled to be not more than 100 ppm by a combination of techniques, such as using hydrochloric acid as a strong acid in the production of a thermoplastic resin, washing with ion exchange water several times before a neutralization step in the production of a thermoplastic resin, washing with ion exchange water several times after the neutralization step, and using sodium hydroxide in the neutralization step.

The light-emitting layer preferably contains magnesium in an amount of 40 ppm or less. When the amount of magnesium in the light-emitting layer is 40 ppm or less, a reduction in the light-emitting ability of the lanthanoid complex can be more reliably suppressed. The light-emitting layer contains magnesium in an amount of more preferably 35 ppm or less, still more preferably 30 ppm or less, particularly preferably 20 ppm or less. The amount of magnesium in the light-emitting layer may be 0 ppm.

The light-emitting layer preferably further contains a dispersant. The presence of a dispersant prevents the lanthanoid complex from aggregating, and allows for more uniform light emission.

Examples of the dispersant include compounds having a sulfonic acid structure such as salts of a linear alkylbenzenesulfonic acid, compounds having an ester structure such as diester compounds, alkyl esters of recinoleic acid, phthalic acid esters, adipic acid esters, sebacic acid esters, and phosphoric acid esters, compounds having an ether structure such as polyoxyethylene glycol, polyoxypropylene glycol, and alkylphenyl-polyoxyethylene ethers, compounds having a carboxylic acid structure such as polycarboxylic acids, compounds having an amine structure such as laurylamine, dimethyllaurylamine, oleyl propylene diamine, polyoxyethylene secondary amines, polyoxyethylene tertiary amines, and polyoxyethylene diamines, compounds having a polyamine structure such as polyalkylene polyamine alkylene oxides, compounds having an amide structure such as oleic acid diethanolamide and fatty acid alkanolamides, and compounds having a high molecular weight amide structure such as polyvinyl pyrrolidone and polyester acid amide amine salts. Other examples include high molecular weight dispersants such as polyoxyethylene alkyl ether phosphates (salts), polycarboxylic acid polymers, and condensed ricinoleic acid esters. The term "high molecular weight dispersant" is defined as a dispersant having a molecular weight of 10000 or higher.

In the case where the dispersant is used, the preferable lower limit of the amount of the dispersant in the light-emitting layer is 1 part by weight relative to 100 parts by weight of the lanthanoid complex in the light-emitting layer, and the preferable upper limit is 50 parts by weight. When the amount of the dispersant is within the range, the lanthanoid complex can be homogeneously dispersed in the light-emitting layer. The lower limit of the amount of the dispersant is more preferably 3 parts by weight, still more preferably 5 parts by weight, and the upper limit is more preferably 30 parts by weight, still more preferably 25 parts by weight.

The light-emitting layer may further contain an ultraviolet absorber. The presence of an ultraviolet absorber in the light-emitting layer improves the lightfastness of the light-emitting layer.

In order to ensure that the interlayer film for laminated glass can produce an image with a much higher contrast, the upper limit of the amount of the ultraviolet absorber relative to 100 parts by weight of the thermoplastic resin in the light-emitting layer is preferably 1 part by weight, more preferably 0.5 parts by weight, still more preferably 0.2 parts by weight, particularly preferably 0.1 parts by weight.

Examples of the ultraviolet absorber include compounds having a malonic acid ester structure, compounds having an oxalic anilide structure, compounds having a benzotriazole structure, compounds having a benzophenone structure, compounds having a triazine structure, compounds having a benzoate structure, and compounds having a hindered amine structure.

The light-emitting layer may further contain a plasticizer.

Any plasticizer may be used, and examples include organic ester plasticizers such as monobasic organic acid esters and polybasic organic acid esters, and phosphoric acid plasticizers such as organic phosphoric acid plasticizers and organic phosphorous acid plasticizers. The plasticizer is preferably a liquid plasticizer.

The monobasic organic acid esters are not particularly limited, and examples include glycolesters obtainable by the reaction of a glycol (e.g. triethylene glycol, tetraethylene glycol, or tripropyleneglycol) and a monobasic organic acid (e.g. butyric acid, isobutyric acid, caproic acid, 2-ethylbutyric acid, heptanoic acid, n-octylic acid, 2-ethylhexanoic acid, pelargonic acid (n-nonylic acid), or decylic acid). In particular, triethylene glycol dicaproate, triethylene glycol di-2-ethylbutyrate, triethylene glycol di-n-octylate, and triethylene glycol di-2-ethylhexylate are preferred.

The polybasic organic acid esters are not particularly limited, and examples include ester compounds of a polybasic organic acid (e.g. adipic acid, sebacic acid, or azelaic acid) and a C4-C8 linear or branched alcohol. In particular, dibutyl sebacate, dioctyl azelate, dibutylcarbitol adipate, and the like are preferred.

The organic ester plasticizers are not particularly limited, and examples include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethyl butyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptyl nonyl adipate, dibutyl sebacate, oil-modified alkyd sebacate, mixtures of a phosphoric acid ester and an adipic acid ester, mixed adipic acid esters produced from an adipic acid ester, a C4-C9 alkyl alcohol, and a C4-C9 cyclic alcohol, and C6-C8 adipic acid esters such as hexyl adipate.

The organic phosphoric acid plasticizers are not particularly limited, and examples include tributoxyethyl phosphate, isodecylphenyl phosphate, and triisopropyl phosphate.

Preferred among the plasticizers is at least one selected from the group consisting of dihexyladipate (DHA), triethylene glycol di-2-ethylhexanoate (3GO), tetraethylene glycol di-2-ethylhexanoate (4GO), triethylene glycol di-2-ethylbutylate (3GH), tetraethylene glycol di-2-ethylbutylate (4GH), tetraethylene glycol di-n-heptanoate (4G7), and triethylene glycol di-n-heptanoate (3G7).

The plasticizer is more preferably triethylene glycol di-2-ethylhexanoate (3GO), triethylene glycol di-2-ethylbutylate (3GH), tetraethylene glycol di-2-ethylhexanoate (4GO), or dihexyladipate (DHA), still more preferably tetraethylene glycol di-2-ethylhexanoate (4GO) or triethylene glycol di-2-ethylhexanoate (3GO), particularly preferably triethylene glycol di-2-ethylhexanoate because these plasticizers are less likely to undergo hydrolysis.

The amount of the plasticizer in the light-emitting layer is not particularly limited, but the preferable lower limit is 20 parts by weight, and the preferable upper limit is 100 parts by weight, relative to 100 parts by weight of the thermoplastic resin. When the amount of the plasticizer is 20 parts by weight or more, the interlayer film for laminated glass has low melt viscosity, which facilitates formation of the interlayer film for laminated glass. When the amount of the plasticizer is 100 parts by weight or less, an interlayer film for laminated glass having high transparency can be produced. The lower limit of the amount of the plasticizer is more preferably 30 parts by weight, still more preferably 35 parts by weight, particularly preferably 50 parts by weight. The upper limit of the amount of the plasticizer is more preferably 80 parts by weight, still more preferably 70 parts by weight, particularly preferably 63 parts by weight.

The light-emitting layer preferably contains an antioxidant to achieve high lightfastness.

Any antioxidant may be used, and examples include antioxidants having a phenolic structure, sulfur-containing antioxidants, and phosphorus-containing antioxidants.

The antioxidants having a phenolic structure refer to antioxidants having a phenolic skeleton. Examples of the antioxidants having a phenolic structure include 2,6-di-t-butyl-β-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and pentaerythritoltetrakis[3-(3,5-di-tert-butyl-4-hydroxyphenyl)propionate]. Any of the antioxidants may be used alone, or two or more of these may be used in combination.

The light-emitting layer may contain an additive such as a photostabilizer, an antistatic agent, a blue dye, a blue pigment, a green dye, or a green pigment as needed.

The interlayer film for laminated glass of the present invention may have a single layer structure consisting only of the light-emitting layer or a multilayer structure in which a different layer is additionally stacked.

In the case where the interlayer film for laminated glass of the present invention has a multilayer structure, the light-emitting layer may be disposed on the entire or part of a face of the interlayer film for laminated glass, and may be disposed on the entire or part of a face in a direction perpendicular to the thickness direction of the interlayer film for laminated glass. In the case where the light-emitting layer is partially disposed, information can be controlled to be displayed only at the disposed part as light-emitting area without being displayed at the other part as non-light-emitting area.

In the case where the interlayer film for laminated glass of the present invention has a multilayer structure, an interlayer film for laminated glass with various functions can be produced by controlling the components constituting the light-emitting layer and a different layer.

For example, in order to obtain the interlayer film for laminated glass of the present invention having sound-insulating properties, the amount of the plasticizer (hereinafter, also referred to as amount X) relative to 100 parts by weight of the thermoplastic resin in the light-emitting layer may be controlled to be more than the amount of the plasticizer (hereinafter, also referred to as amount Y) relative to 100 parts by weight of the thermoplastic resin in the different layer. In this case, the amount X is more than the amount Y preferably by 5 parts by weight or more, more preferably by 10 parts by weight or more, still more preferably by 15 parts by weight or more. For allowing the interlayer film for laminated glass to have higher penetration resistance, the difference between the amount X and the amount Y is preferably 50 parts by weight or less, more preferably 40 parts by weight or less, still more preferably 35 parts by weight or less. The difference between the amount X and the amount Y is calculated based on the following formula: (difference between the amount X and the amount Y)=(the amount X−the amount Y)

The lower limit of the amount X is preferably 45 parts by weight, more preferably 50 parts by weight, still more preferably 55 parts by weight, and the upper limit of the amount X is preferably 80 parts by weight, more preferably 75 parts by weight, still more preferably 70 parts by weight. When the amount X is adjusted to the preferable lower limit or more, high sound-insulating properties can be exerted. When the amount X is adjusted to the preferable upper limit or less, the plasticizer can be prevented from bleeding out, so that a reduction in the transparency or the adhesiveness of the interlayer film for laminated glass can be prevented.

The lower limit of the amount Y is preferably 20 parts by weight, more preferably 30 parts by weight, still more preferably 35 parts by weight, and the upper limit of the amount Y is preferably 45 parts by weight, more preferably 43 parts by weight, still more preferably 41 parts by weight. When the amount Y is adjusted to the preferable lower limit or more, high penetration resistance can be exerted. When the amount Y is adjusted to the preferable upper limit or less, the plasticizer can be prevented from bleeding out, so that a reduction in the transparency or the adhesiveness of the interlayer film for laminated glass can be prevented.

In order to obtain the interlayer film for laminated glass of the present invention having sound-insulating properties, the thermoplastic resin in the light-emitting layer is preferably a polyvinyl acetal X. The polyvinyl acetal X can be prepared by acetalization of a polyvinyl alcohol with an aldehyde. Usually, the polyvinyl alcohol can be obtained by saponification of polyvinyl acetate. The lower limit of the average degree of polymerization of the polyvinyl alcohol is preferably 200, and the upper limit thereof is preferably 5000. When the average degree of polymerization of the polyvinyl alcohol is 200 or higher, the penetration resistance of the interlayer film for laminated glass to be obtained can be improved. When the average degree of polymerization of the polyvinyl alcohol is 5000 or lower, formability of the light-emitting layer can be ensured. The lower limit of the average degree of polymerization of the polyvinyl alcohol is more preferably 500, and the upper limit thereof is more preferably 4000. The average degree of polymerization of the polyvinyl alcohol is determined by a method in accordance with "Testing methods for polyvinyl alcohol" in JIS K 6726.

The lower limit of the carbon number of an aldehyde used for acetalization of the polyvinyl alcohol is preferably 4, and the upper limit thereof is preferably 6. When an aldehyde having 4 or more carbon atoms is used, a sufficient amount of the plasticizer can be stably contained so that excellent sound-insulating properties can be obtained. Moreover, bleeding out of the plasticizer can be prevented. When an aldehyde having 6 or less carbon atoms is used, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the plasticizer can be contained in an amount needed for exhibiting sound-insulating properties. Thus, bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage (mol %) of the mol fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy group are bonded in the polyvinyl acetal X by a method in accordance with "Testing methods for polyvinyl butyral" in JIS K 6728.

The lower limit of the acetal group content of the polyvinyl acetal X is preferably 60 mol %, and the upper limit thereof is preferably 85 mol %. When the acetal group content of the polyvinyl acetal X is 60 mol % or more, the light-emitting layer has higher hydrophobicity and can contain the plasticizer in an amount needed for exhibiting sound-insulating properties. Thus, bleeding out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol %. The acetal group content can be determined by measuring the amount of ethylene groups to which acetal groups are bonded in the polyvinyl acetal X by a method in accordance with "Testing methods of polyvinyl butyral" in JIS K 6728.

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the plasticizer can be contained in an amount needed for exhibiting sound-insulating properties, and bleeding out of the plasticizer can be prevented. When the acetyl group content of the polyvinyl acetal X is 30 mol % or less, the light-emitting layer has higher hydrophobicity to prevent whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage (mol %) of the mol fraction obtained by subtracting the amount of ethylene groups to which acetal groups are bonded and the amount of ethylene groups to which hydroxy group are bonded from the amount of all the ethylene groups in the main chain and dividing the resulting value by the amount of all the ethylene groups in the main chain.

The polyvinyl acetal X is especially preferably polyvinyl acetal with the acetyl group content of 8 mol % or more or polyvinyl acetal with the acetyl group content of less than 8 mol % and the acetal group content of 65 mol % or more. In this case, the light-emitting layer can readily contain the plasticizer in an amount needed for exhibiting sound-insulating properties. The polyvinyl acetal X is more preferably polyvinyl acetal having an acetyl group content of 8 mol % or more or polyvinyl acetal having an acetyl group content of less than 8 mol % and an acetal group content of 68 mol % or more.

In order to impart sound-insulating properties to the interlayer film for laminated glass of the present invention, the thermoplastic resin in the different layer is preferably a polyvinyl acetal Y. The polyvinyl acetal Y preferably contains a larger amount of hydroxy group than the polyvinyl acetal X.

The polyvinyl acetal Y can be prepared by acetalization of a polyvinyl alcohol with an aldehyde. The polyvinyl alcohol can be usually obtained by saponification of polyvinyl acetate. The lower limit of the average degree of polymerization of the polyvinyl alcohol is preferably 200, and the upper limit thereof is preferably 5000. When the average degree of polymerization of the polyvinyl alcohol is 200 or more, the penetration resistance of the interlayer film for laminated glass can be improved. When the average degree of polymerization of the polyvinyl alcohol is 5000 or less, the formability of the different layer can be ensured. The lower limit of the average degree of polymerization of the polyvinyl alcohol is more preferably 500, and the upper limit thereof is more preferably 4000.

The lower limit of the carbon number of an aldehyde used for acetalization of the polyvinyl alcohol is preferably 3, and the upper limit thereof is preferably 4. When the aldehyde having 3 or more carbon atoms is used, the penetration resistance of the interlayer film for laminated glass is improved. When the aldehyde having 4 or less carbon atoms is used, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the hydroxy group content of the polyvinyl acetal Y is 33 mol % or less, whitening of the interlayer film for laminated glass can be prevented. When the hydroxy group content of the polyvinyl acetal Y is 28 mol % or more, the penetration resistance of the interlayer film for laminated glass can be improved.

The lower limit of the acetal group content of the polyvinyl acetal Y is preferably 60 mol %, and the upper limit thereof is preferably 80 mol %. When the acetal group content is 60 mol % or more, the plasticizer in an amount needed for exhibiting sufficient penetration resistance can be contained. When the acetal group content is 80 mol % or less, the adhesiveness between the different layer and glass can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the different layer has higher hydrophobicity, thereby preventing whitening. The upper limit of the acetyl group content is more preferably 2 mol %, and the lower limit thereof is preferably 0.1 mol %. The hydroxy group content, acetal group content, and acetyl group content of the polyvinyl acetal Y can be measured by the same methods as those described for the polyvinyl acetal X.

In order to obtain the interlayer film for laminated glass of the present invention having heat insulation properties, for example, one, two, or all of the light-emitting layer and different layer(s) may contain a heat ray absorber.

The heat ray absorber is not particularly limited as long as it shields infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

In the case where the light-emitting layer contains a heat ray absorber, the amount of the heat ray absorber in 100% by weight of the light-emitting layer is preferably 0.00001% by weight or more and 1% by weight or less. In the case where the different layer contains a heat ray absorber, the amount of the heat ray absorber in 100% by weight of the different layer is preferably 0.00001% by weight or more and 1% by weight or less. When the amount of the heat ray absorber in the light-emitting layer or the different layer is within the above preferable range, the interlayer film for laminated glass and laminated glass have improved heat insulation properties.

The thickness of the interlayer film for laminated glass of the present invention is not particularly limited. The lower limit of the thickness is preferably 50 µm, more preferably 100 µm, and the upper limit of the thickness is preferably 2200 µm, more preferably 1700 µm, still more preferably 1000 µm, particularly preferably 900 µm.

The lower limit of the thickness of the entire interlayer film for laminated glass means the thickness of the thinnest part of the entire interlayer film for laminated glass. The upper limit of the thickness of the entire interlayer film for laminated glass means the thickness of the thickest part of the entire interlayer film for laminated glass. In the case where the interlayer film for laminated glass of the present invention has a multilayer structure, the thickness of the light-emitting layer is not particularly limited, but the lower limit of the thickness is preferably 50 µm, and the upper limit of the thickness is preferably 1000 µm. When the light-emitting layer has a thickness within this range, it can emit light with sufficiently high contrast when irradiated with a light beam of a specific wavelength. The lower limit of the thickness of the light-emitting layer is more preferably 80 µm, still more preferably 90 µm, and the upper limit of the thickness is more preferably 760 µm, still more preferably 500 µm, particularly preferably 300 µm.

The interlayer film for laminated glass of the present invention may have a wedge-shaped cross section. In the case of the interlayer film for laminated glass having a wedge-shaped cross section, the wedge angle θ of the wedge shape can be controlled depending on the angle to attach the laminated glass, so that images can be displayed without double image phenomenon. For further preventing double image phenomenon, the lower limit of the wedge angle θ is preferably 0.1 mrad, more preferably 0.2 mrad, still more preferably 0.3 mrad, and the upper limit is preferably 1 mrad, more preferably 0.9 mrad. In the case where the interlayer film for laminated glass having a wedge-shaped cross section is produced by, for example, molding a resin composition by extrusion using an extruder, the interlayer may be thinnest at a region slightly inside of the edge on a thinner side thereof (specifically, when the distance from one side to the other side is X, the region of 0X to 0.2X from the edge on the thinner side toward the inside) and thickest at a region slightly inside of the edge on a thicker side thereof (specifically, when the distance from one side to the other side is X, the region of 0X to 0.2X from the edge on the thicker side toward the inside). Herein, such a shape is included in the wedge shape.

In the case of the interlayer film for laminated glass of the present invention having a wedge-shaped cross section, it preferably has a multilayer structure including a light-emitting layer and a different layer (hereinafter, also referred to as a "shape-adjusting layer"). The cross-sectional shape of the entire interlayer film for laminated glass can be controlled to have a wedge shape with a certain wedge angle by controlling the thickness of the light-emitting layer to be within a certain range and stacking the shape-adjusting layer. The shape-adjusting layer may be stacked on only one or both of the faces of the light-emitting layer. Further, multiple shape-adjusting layers may be stacked.

The light-emitting layer may have a wedge-shaped cross section or a rectangular cross section. Preferably, the difference between the maximum thickness and the minimum thickness of the light-emitting layer is 100 μm or less. In this case, images can be displayed with a certain level of luminance. The difference between the maximum thickness and the minimum thickness of the light-emitting layer is more preferably 95 μm or less, still more preferably 90 μm or less.

In the case of the interlayer film for laminated glass of the present invention having a wedge-shaped cross section, the thickness of the light-emitting layer is not particularly limited. The lower limit of the thickness is preferably 50 μm, and the upper limit of the thickness is preferably 700 μm. When the light-emitting layer has a thickness within the above range, sufficiently high contrast images can be displayed. The lower limit of the thickness of the light-emitting layer is more preferably 70 μm, still more preferably 80 μm, and the upper limit of the thickness is more preferably 400 μm, still more preferably 150 μm. The lower limit of the thickness of the light-emitting layer means the thickness of the thinnest part of the light-emitting layer. The upper limit of the thickness of the light-emitting layer means the thickness of the thickest part of the light-emitting layer.

The shape-adjusting layer is stacked on the light-emitting layer to control the cross-sectional shape of the entire interlayer film for laminated glass into a wedge shape with a certain wedge angle. Preferably, the shape-adjusting layer has a wedge-shaped, triangular, trapezoidal, or rectangular cross section. The cross-sectional shape of the entire interlayer film for laminated glass can be controlled to be a wedge shape with a certain wedge angle by stacking a shape-adjusting layer having a wedge-shaped, triangular, or trapezoidal cross section. Moreover, the cross-sectional shape of the entire interlayer film for laminated glass can be controlled using multiple shape-adjusting layers in combination.

The thickness of the shape-adjusting layer is not particularly limited. In view of the practical aspect and sufficient enhancement of the adhesive force and penetration resistance, the lower limit of the thickness is preferably 10 μm, more preferably 200 μm, still more preferably 300 μm, and the upper limit of the thickness is preferably 1000 μm, more preferably 800 μm. The lower limit of the thickness of the shape-adjusting layer means the thickness of the thinnest part of the shape-adjusting layer. The upper limit of the thickness of the shape-adjusting layer means the thickness of the thickest part of the shape-adjusting layer. When multiple shape-adjusting layers are used in combination, the thickness of the shape-adjusting layer means a total thickness of the shape-adjusting layers.

Figure 1:
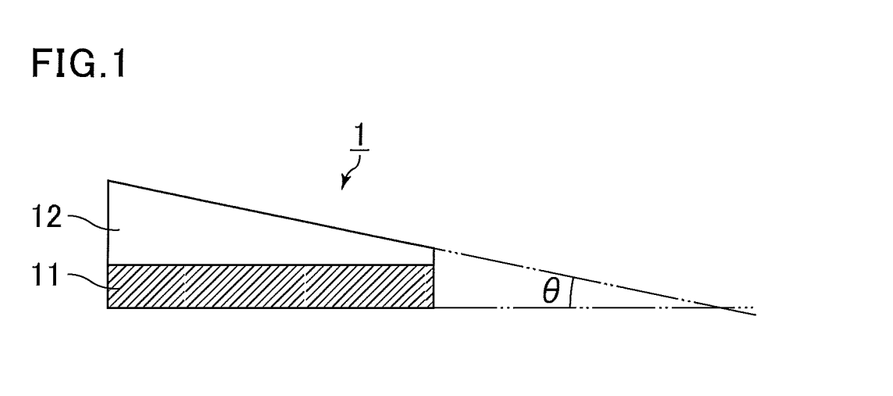
FIG. 1 illustrates a schematic view of an exemplary embodiment of the interlayer film for laminated glass of the present invention having a wedge-shaped cross section.
Figure 2:
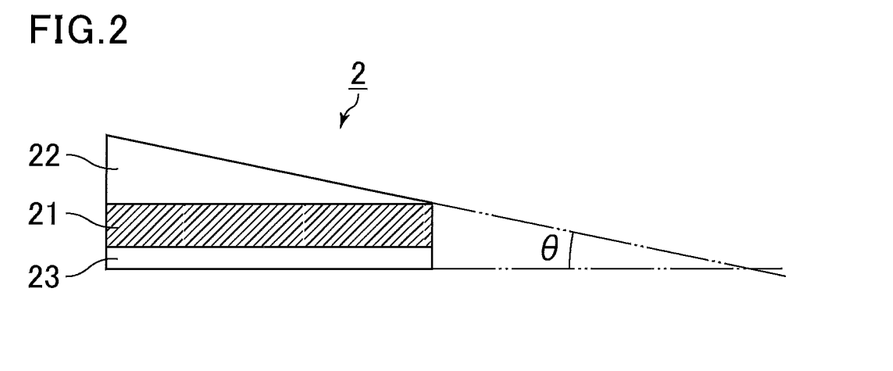
FIG. 2 illustrates a schematic view of an exemplary embodiment of the interlayer film for laminated glass of the present invention having a wedge-shaped cross section.
Figure 3:
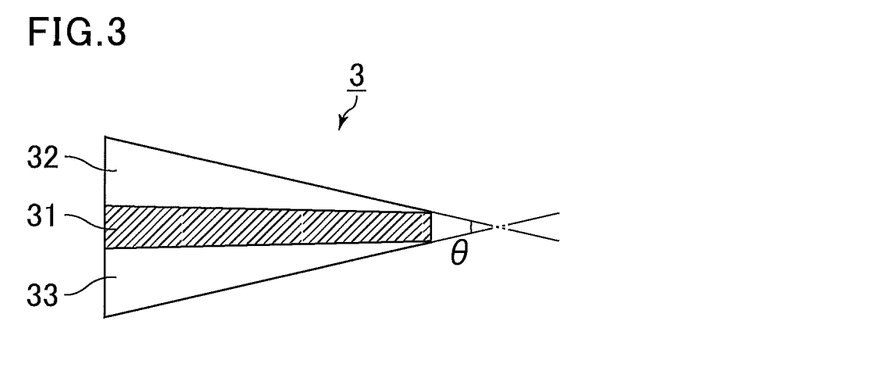
FIG. 3 illustrates a schematic view of an exemplary embodiment of the interlayer film for laminated glass of the present invention having a wedge-shaped cross section.

FIGS. 1 to 3 each illustrate a schematic view of an exemplary embodiment of the interlayer film for laminated glass of the present invention having a wedge-shaped cross section. For the convenience of illustration, the interlayer films for laminated glass and the layers forming the interlayer films for laminated glass in FIGS. 1 to 3 are illustrated to have different thicknesses and wedge angles from those of the actual products.

FIG. 1 illustrates a cross section of an interlayer film for laminated glass 1 in the thickness direction. The interlayer film for laminated glass 1 has a two-layer structure in which a shape-adjusting layer 12 is stacked on one face of a light-emitting layer 11 containing a light-emitting material. The entire interlayer film for laminated glass 1 is allowed to have a wedge shape with a wedge angle θ of 0.1 to 1 mrad by using the shape-adjusting layer 12 having a wedge, triangular, or trapezoidal shape together with the light-emitting layer 11 having a rectangular shape.

FIG. 2 illustrates a cross section of an interlayer film for laminated glass 2 in the thickness direction. The interlayer film for laminated glass 2 has a three-layer structure in which a shape-adjusting layer 22 and a shape-adjusting layer 23 are stacked on respective surfaces of a light-emitting layer 21 containing a light-emitting material. The entire interlayer film for laminated glass 2 is allowed to have a wedge shape with a wedge angle θ of 0.1 to 1 mrad by using the shape-adjusting layer 22 having a wedge, triangular, or trapezoidal shape together with the light-emitting layer 21 and the shape-adjusting layer 23 both having a rectangular shape with a certain thickness.

FIG. 3 illustrates a cross section of an interlayer film for laminated glass 3 in the thickness direction. The interlayer film for laminated glass 3 has a three-layer structure in which a shape-adjusting layer 32 and a shape-adjusting layer 33 are stacked on respective surfaces of a light-emitting layer 31 containing a light-emitting material. The entire interlayer film for laminated glass 3 is allowed to have a wedge shape with a wedge angle θ of 0.1 to 1 mrad by using the light-emitting layer 31 having a moderate wedge shape with the difference between the maximum thickness and the minimum thickness of 100 μm or less and stacking the wedge-shaped shape-adjusting layers 32 and 33.

The interlayer film for laminated glass of the present invention can be produced by any method. The interlayer film for laminated glass can be produced by, for example, preparing a resin composition for light-emitting layers by sufficiently mixing a plasticizer solution containing a plasticizer and a lanthanoid complex with a thermoplastic resin, and extruding the resin composition for light-emitting layers using an extruder.

Due to the light-emitting layer, the interlayer film for laminated glass of the present invention emits light under radiation of light at specific wavelengths. This feature allows for display of information with a high contrast.

Examples of devices for radiation of light at specific wavelengths include a spot light source (LC-8 available from Hamamatsu Photonics K.K.), a xenon flush lamp (CW lamp available from Heraeus), and a black light (Carry Hand available from Iuchi Seieido Co., Ltd.).

A laminated glass including the interlayer film for laminated glass of the present invention between a pair of glass plates is also one aspect of the present invention.

The glass plates maybe common transparent glass plates. Examples include plates of inorganic glass such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. However, this glass plate is preferably used on the side opposite to the side to be exposed to radiation of light at specific wavelengths. Other examples of the glass plates include organic plastic plates made of polyethylene terephthalate, polycarbonate, polyacrylate, or the like.

The glass plates may include two or more types of glass plates. For example, the laminated glass may be a laminate including the interlayer film for laminated glass of the present invention between a transparent float glass plate and a colored glass plate such as a green glass plate. The glass plates may include two or more glass plates with a different thickness.

Advantageous Effects of Invention

The present invention can provide an interlayer film for laminated glass capable of displaying images with a high luminous intensity when irradiated with a light beam and having excellent durability, and a laminated glass including the interlayer film for laminated glass.

DESCRIPTION OF EMBODIMENTS

Embodiments of the present invention are more specifically described below with reference to, but not limited to, examples.

<Preparation of polyvinyl butyral>
(Preparation of PVB1-1)

To a 2 $m^3$ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution and was then washed ten times with a 10-fold amount (by mass) of ion exchange water (washing after neutralization). The resulting solid was dehydrated and dried, thereby obtaining polyvinyl butyral 1-1 (hereinafter, also referred to as "PVB1-1"). The acetyl group content, butyral group content, and hydroxy group content of PVB1-1 were 1 mol %, 69 mol %, and 30 mol %, respectively.

(Preparation of PVB1-2)

To a 2 $m^3$ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.15% by mass sodium hydroxide aqueous solution. The resulting solid was dehydrated and dried, thereby obtaining polyvinyl butyral 1-2 (hereinafter, also referred to as "PVB1-2"). The acetyl group content, butyral group content, and hydroxy group content of PVB1-2 were 1 mol %, 69 mol %, and 30 mol %, respectively.

(Preparation of PVB1-3)

To a 2 $m^3$ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 20% by mass hydrochloric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution. The resulting solid was dehydrated and dried, thereby obtaining polyvinyl butyral 1-3 (hereinafter, also referred to as "PVB1-3"). The acetyl group content, butyral group content, and hydroxy group content of PVB1-3 were 1 mol %, 69 mol %, and 30 mol %, respectively.

(Preparation of PVB1-4)

To a 2 $m^3$ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed five times with a 10-fold amount (by mass) of ion exchange water (washing before neutralization). The washed solid was sufficiently neutralized using a 0.3% by mass sodium hydrogen carbonate aqueous solution and was then washed ten times with a 10-fold amount (by mass) of ion exchange water (washing after neutralization). The resulting solid was dehydrated and dried, thereby obtaining polyvinyl butyral 1-4 (hereinafter, also referred to as "PVB1-4"). The acetyl group content, butyral group content, and hydroxy group content of PVB1-4 were 1 mol %, 69 mol %, and 30 mol %, respectively.

(Preparation of PVB1-5)

To a 2 m³ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was sufficiently neutralized using a 0.3% by mass sodium hydrogen carbonate aqueous solution and was then washed ten times with a 10-fold amount (by mass) of ion exchange water (washing after neutralization). The resulting solid was dehydrated and dried, thereby obtaining polyvinyl butyral 1-5 (hereinafter, also referred to as "PVB1-5"). The acetyl group content, butyral group content, and hydroxy group content of PVB1-5 were 1 mol %, 69 mol %, and 30 mol %, respectively.

(Preparation of PVB1-6)

To a 2 m³ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution. The resulting solid was dehydrated and dried, thereby obtaining polyvinyl butyral 1-6 (hereinafter, also referred to as "PVB1-6"). The acetyl group content, butyral group content, and hydroxy group content of PVB1-6 were 1 mol %, 69 mol %, and 30 mol %, respectively.

(Preparation of PVB1-7)

To a 2 m³ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.15% by mass sodium hydroxide aqueous solution and was then washed four times with a 10-fold amount (by mass) of ion exchange water (washing after neutralization). The resulting solid was dehydrated and dried, thereby obtaining polyvinyl butyral 1-7 (hereinafter, also referred to as "PVB1-7"). The acetyl group content, butyral group content, and hydroxy group content of PVB1-7 were 1 mol %, 69 mol %, and 30 mol %, respectively.

(Preparation of PVB1-8)

To a 2 m³ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 20% by mass hydrochloric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed three times with a 10-fold amount (by mass) of ion exchange water (washing before neutralization). The washed solid was sufficiently neutralized using a 0.3% by mass sodium hydrogen carbonate aqueous solution. The resulting solid was dehydrated and dried, thereby obtaining polyvinyl butyral 1-8 (hereinafter, also referred to as "PVB1-8"). The acetyl group content, butyral group content, and hydroxy group content of PVB1-8 were 1 mol %, 69 mol %, and 30 mol %, respectively.

(Preparation of PVB1-9)

To a 2 m³ reactor fitted with a stirrer were charged 1700 kg of a 7.5% by mass aqueous solution of PVA (degree of polymerization: 1700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 20% by mass hydrochloric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution and was then washed six times with a 10-fold amount (by mass) of ion exchange water (washing after neutralization). The resulting solid was dehydrated and dried, thereby obtaining polyvinyl butyral 1-9 (hereinafter, also referred to as "PVB1-9"). The acetyl group content, butyral group content, and hydroxy group content of PVB1-9 were 1 mol %, 69 mol %, and 30 mol %, respectively.

(Preparation of PVB2-1)

To a 2 m³ reactor fitted with a stirrer were charged 1700 kg of a 7.5% by mass aqueous solution of PVA (degree of polymerization: 2400, degree of saponification: 88 mol%), 119.4 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution and was then washed ten times with a 10-fold amount (by mass) of ion exchange water (washing after neutralization). The resulting solid was dehydrated and dried, thereby obtaining polyvinyl butyral 2-1 (hereinafter, also referred to as "PVB2-1"). The acetyl group content, butyral group content, and hydroxy group content of PVB2-1 were 12 mol %, 66 mol %, and 22 mol %, respectively.

(Preparation of PVB2-2)

To a 2 m$^3$ reactor fitted with a stirrer were charged 1700 kg of a 7.5% by mass aqueous solution of PVA (degree of polymerization: 2400, degree of saponification: 88 mol %), 119.4 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution. The resulting solid was dehydrated and dried, thereby obtaining polyvinyl butyral 2-2 (hereinafter, also referred to as "PVB2-2"). The acetyl group content, butyral group content, and hydroxy group content of PVB2-2 were 12 mol %, 66 mol %, and 22 mol %, respectively.

EXAMPLE 1

(1) Preparation of Eu(TFA)$_3$phen

Europium acetate (Eu(CH$_3$COO)$_3$) in an amount of 5 g (12.5 mmol) was dissolved in 50 mL of distilled water. To the solution was added 7 g (33.6 mmol) of trifluoroacetylacetone (TFA, CH$_3$COCH$_2$COCF$_3$) and stirred at room temperature for 3 hours. The precipitated solid was filtered, washed with water, and recrystallized using methanol and distilled water to give Eu(TFA)$_3$(H$_2$O)$_2$. Then, 5.77 g of the resulting complex (Eu(TFA)$_3$(H$_2$O)$_2$) and 2.5 g of 1,10-phenanthroline (phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure to give a powder. Through recrystallization using a solvent mixture of toluene and hexane, Eu(TFA)$_3$phen was obtained.

(2) Production of Interlayer Film for Laminated Glass and Laminated Glass

A luminous plasticizer solution was prepared by adding 0.2 parts by weight of the Eu(TFA)$_3$phen obtained above as light-emitting particles to 40 parts by weight of triethylene glycol di-2-ethylhexanoate (3GO). The entire amount of the plasticizer solution was sufficiently kneaded with 100 parts by weight of PVB1-1 using a mixing roll to give a resin composition.

The resin composition was extruded with an extruder to provide an interlayer film for laminated glass (thickness: 760 μm).

The resulting interlayer film for laminated glass was interposed between a pair of clear glass plates (thickness: 2.5 mm, 5 cm in length×5 cm in width) to prepare a laminate. The laminate was press-bonded under vacuum at 90° C. for 30 minutes using a vacuum laminator. The press-bonded laminate was subjected to further 20-minute press-bonding under 14 MPa at 140° C. using an autoclave, thereby obtaining a laminated glass.

EXAMPLE 2

(1) Preparation of Eu(TFA)$_3$dpphen

Eu(TFA)$_3$dpphen was obtained as in Example 1, except that 4,7-diphenyl phenanthroline was used instead of 1,10-phenanthroline.

(2) Production of Interlayer Film for Laminated Glass and Laminated Glass

An interlayer film for laminated glass and a laminated glass were produced as in Example 1, except that the Eu(TFA)$_3$dpphen obtained above was used as light-emitting particles.

EXAMPLE 3

(1) Preparation of Eu(HFA)$_3$phen

Eu(HFA)$_3$phen was prepared as in Example 1, except that hexafluoroacetylacetone was used instead of trifluoroacetylacetone.

(2) Production of Interlayer Film for Laminated Glass and Laminated Glass

An interlayer film for laminated glass and a laminated glass were produced as in Example 1, except that the Eu(HFA)$_3$phen obtained above was used as light-emitting particles.

EXAMPLE 4

(1) Preparation of Tb(TFA)$_3$phen

Tb(TFA)$_3$phen was prepared as in Example 1, except that terbium acetate was used instead of europium acetate.

(2) Production of Interlayer Film for Laminated Glass and Laminated Glass

An interlayer film for laminated glass and a laminated glass were produced as in Example 1, except that the Tb(TFA)$_3$phen obtained above was used as light-emitting particles.

EXAMPLES 5 TO 7

An interlayer film for laminated glass and a laminated glass were produced as in Example 1, except that the polyvinyl butyral resin and light-emitting particles shown in Table 1 were used.

COMPARATIVE EXAMPLE 1

An interlayer film for laminated glass and a laminated glass were produced as in Example 2, except that the polyvinyl butyral resin used was changed to PVB1-5.

COMPARATIVE EXAMPLE 2

An interlayer film for laminated glass and a laminated glass were produced as in Example 2, except that the polyvinyl butyral resin used was changed to PVB1-6.

COMPARATIVE EXAMPLES 3 and 4

An interlayer film for laminated glass and a laminated glass were produced as in Example 1, except that the polyvinyl butyral resin and light-emitting particles shown in Table 1 were used.

EXAMPLES 8 TO 12, COMPARATIVE EXAMPLES 5 and 6

An interlayer film for laminated glass and a laminated glass were produced as in Example 1, except that the polyvinyl butyral resin and light-emitting particles shown in Table 2 were used, and the amount of the light-emitting particles was changed as shown in Table 2.

EXAMPLE 13

To 40 parts by weight of triethylene glycol di-2-ethylhexanoate (3GO) was added 0.2 parts by weight of the Eu(HFA)$_3$phen obtained in Example 3. Further, tin-doped indium oxide particles (ITO particles) as a heat ray absorber was added in an amount of 0.15% by weight in 100% by weight of an interlayer film to be obtained so that a luminous plasticizer solution was prepared. The entire amount of the plasticizer solution was sufficiently kneaded with 100 parts by mass of PVB1-1 using a mixing roll to give a resin composition.

The resin composition was extruded with an extruder to provide an interlayer film for laminated glass (thickness: 760 μm).

The resulting interlayer film for laminated glass was interposed between a pair of clear glass plates (thickness: 2.5 mm, 5 cm in length×5 cm in width) to prepare a laminate. The laminate was press-bonded under vacuum at 90° C. for 30 minutes using a vacuum laminator. The press-bonded laminate was subjected to further 20-minute press-bonding under 14 MPa at 140° C. using an autoclave, thereby obtaining a laminated glass.

EXAMPLE 14

To 40 parts by weight of triethylene glycol di-2-ethylhexanoate (3GO) was added 0.2 parts by weight of the Eu(HFA)$_3$phen obtained in Example 3. Further, cesium-doped tungsten oxide (Cs0.33WO3) particles (CWO particles) as a heat ray absorber was added in an amount of 0.05% by weight in 100% by weight of an interlayer film to be obtained so that a luminous plasticizer solution was prepared. The entire amount of the plasticizer solution was sufficiently kneaded with 100 parts by mass of PVB1-1 using a mixing roll to give a resin composition.

The resin composition was extruded with an extruder to provide an interlayer film for laminated glass (thickness: 760 μm).

The resulting interlayer film for laminated glass was interposed between a pair of clear glass plates (thickness: 2.5 mm, 5 cm in length×5 cm in width) to prepare a laminate. The laminate was press-bonded under vacuum at 90° C. for 30 minutes using a vacuum laminator. The press-bonded laminate was subjected to further 20-minute press-bonding under 14 MPa at 140° C. using an autoclave, thereby obtaining a laminated glass.

EXAMPLES 15 AND 16

An interlayer film for laminated glass and a laminated glass were produced as in Example 13, except that the light-emitting particles and heat ray absorber shown in Table 3 were used, and the amount of the heat ray absorber was changed as shown in Table 3.

EXAMPLE 17

(Preparation of Resin Composition for Light-Emitting Layers)

A luminous plasticizer solution was prepared by adding 0.5 parts by weight of the Eu (HFA)$_3$phen obtained in Example 3 to 40 parts by weight of triethylene glycol di-2-ethylhexanoate (3GO). The entire amount of the plasticizer solution was sufficiently kneaded with 100 parts by mass of PVB1-1 using a mixing roll to give a resin composition for light-emitting layers.

(Preparation of Resin Composition for Adhesive Layers)

A resin composition for adhesive layers was prepared by sufficiently kneading 40 parts by weight of triethylene glycol di-2-ethylhexanoate (3GO) and 100 parts by mass of PVB1-9 using a mixing roll.

(Production of Interlayer Film for Laminated Glass and Laminated Glass)

The resin composition for light-emitting layers and the resin composition for adhesive layers were co-extruded using a coextruder to prepare an interlayer film for laminated glass (thickness: 0.8 mm) in which a light-emitting layer was interposed between two adhesive layers. The light-emitting layer had a thickness of 0.1 mm, and the adhesive layer had a thickness of 0.35 mm.

The resulting interlayer film for laminated glass was interposed between a pair of clear glass plates (thickness: 2.5 mm, 5 cm in length×5 cm in width) to prepare a laminate. The laminate was press-bonded under vacuum at 90° C. for 30 minutes using a vacuum laminator. The press-bonded laminate was subjected to further 20-minute press-bonding under 14 MPa at 140° C. using an autoclave, thereby obtaining a laminated glass.

(Production of Laminated Glass for Evaluation of Penetration Resistance)

The resulting interlayer film for laminated glass was interposed between a pair of clear glass plates (thickness: 2.5 mm, 30 cm in length×30 cm in width) to prepare a laminate. The laminate was press-bonded under vacuum at 90° C. for 30 minutes using a vacuum laminator. The press-bonded laminate was subjected to further 20-minute press-bonding under 14 MPa at 140° C. using an autoclave. The portion of the interlayer film protruding from the glass plates was cut off, thereby obtaining a laminated glass for evaluation of penetration resistance.

EXAMPLES 18 TO 21, COMPARATIVE EXAMPLES 7 and 8

An interlayer film for laminated glass and a laminated glass were produced as in Example 17, except that the polyvinyl butyral resin and light-emitting particles shown in Table 4 were used, and the amount of the plasticizer was changed as shown in Table 4.

EXAMPLE 22

(Preparation of Resin Composition for Light-Emitting Layers)

A luminous plasticizer solution was prepared by adding 0.5 parts by weight of the Eu(HFA)$_3$phen obtained in Example 3 to 40 parts by weight of triethylene glycol di-2-ethylhexanoate (3GO). The entire amount of the plasticizer solution was sufficiently kneaded with 100 parts by mass of PVB1-1 using a mixing roll to give a resin composition for light-emitting layers.

(Preparation of Resin Composition for Shape-Adjusting Layers)

A resin composition for shape-adjusting layers was prepared by sufficiently kneading 40 parts by weight of triethylene glycol di-2-ethylhexanoate (3GO) and 100 parts by weight of PVB1-9 using a mixing roll.

(Production of Interlayer Film for Laminated Glass and Laminated Glass)

The resin composition for light-emitting layers and the resin composition for shape-adjusting layers were co-extruded using a coextruder to prepare an interlayer film for laminated glass shown in FIG. 3 having a three-layer structure in which a shape-adjusting layer, a light-emitting layer, and a shape-adjusting layer were stacked in this order. The minimum distance from one edge to the other edge of the obtained interlayer film in a direction perpendicular to the extrusion direction was measured to be 1 m.

The light-emitting layer of the resulting interlayer film for laminated glass had a wedge-shaped cross section with a minimum thickness of 100 μm and a maximum thickness of 200 μm. The entire interlayer film for laminated glass had a minimum thickness of 800 μm, a maximum thickness of 1250 μm, and a wedge angle θ of 0.45 mrad. The interlayer film for laminated glass was thinnest at one edge and thickest at the other edge. The minimum thickness and maximum thickness were measured by observation using an optical microscope.

The interlayer film was interposed between two transparent float glass plates (1000 mm in length×300 mm in width×2.5 mm in thickness) to prepare a laminate. The laminate was temporarily press-bonded using a heating roll at 230° C. The temporarily press-bonded laminate was press-bonded by a roll heat method using an autoclave under a pressure of 1.2 MPa at 135° C. for 20 minutes, thereby obtaining a laminated glass (1000 mm in length×300 mm in width).

(Production of Laminated Glass for Luminance Measurement)

The interlayer film (thin part) having a length of 10 cm and a width of 10 cm was cut out in a manner the center thereof was 10 cm from one edge and on the line with the minimum distance from the one edge to the other edge. The resulting interlayer film (thin part) was interposed between two transparent float glass plates (5 cm in length×5 cm in width×2.5 mm in thickness) to prepare a laminate. The laminate was temporarily press-bonded using a heating roll at 230° C. The temporarily press-bonded laminate was press-bonded by a roll heat method using an autoclave under a pressure of 1.2 MPa at 135° C. for 20 minutes, thereby obtaining a laminated glass for luminance measurement (5 cm in length×5 cm in width).

EXAMPLES 23 TO 25, COMPARATIVE EXAMPLES 9 and 10

An interlayer film for laminated glass and a laminated glass were produced as in Example 22, except that the polyvinyl butyral resin and the light-emitting particles shown in Table 5 were used, and the maximum thickness of the entire interlayer film and the wedge angle θ were changed as shown in Table 5.

EXAMPLE 26

(Preparation of Resin Composition for Light-Emitting Layers)

A luminous plasticizer solution was prepared by adding 0.2 parts by weight of the Eu(HFA)$_3$phen obtained in Example 3 to 40 parts by weight of triethylene glycol di-2-ethylhexanoate (3GO). The entire amount of the plasticizer solution and 100 parts by weight of PVB1-1 were sufficiently kneaded using a mixing roll to prepare a resin composition for light-emitting layers.

(Preparation of Resin Composition for First Resin Layer and Second Resin Layer)

A resin composition for shape-adjusting layers was prepared by sufficiently kneading 40 parts by weight of triethylene glycol di-2-ethylhexanoate (3GO) and 100 parts by weight of PVB1-1 using a mixing roll.

(Preparation of Resin Composition for Sound Insulating Layers)

A resin composition for sound insulating layers was prepared by sufficiently kneading 60 parts by weight of triethylene glycol di-2-ethylhexanoate (3GO) and 100 parts by weight of PVB2-1 using a mixing roll.

(Production of Interlayer Film for Laminated Glass and Laminated Glass)

The resin composition for light-emitting layers was extruded into a single layer using an extruder to prepare a light-emitting layer (thickness: 760 μm).

The resin composition for first resin layer and second resin layer and the resin composition for sound insulating layers were co-extruded using a coextruder to prepare a laminate having a three-layer structure as shown in FIG. 3 in which a first resin layer, a sound insulating layer, and a second resin layer were stacked in this order. The light-emitting layer was stacked on the outer surface of the second resin layer of the laminate, thereby obtaining an interlayer film for laminated glass. The minimum distance from one edge to the other edge of the obtained interlayer film in a direction perpendicular to the extrusion direction was measured to be 1 m.

In the resulting interlayer film for laminated glass, the sound insulating layer had a wedge-shaped cross section with a minimum thickness of 100 μm and a maximum thickness of 200 μm; the first resin layer had a wedge-shaped cross section with a minimum thickness of 350 μm and a maximum thickness of 525 μm; and the second resin layer had a wedge-shaped cross section with a minimum thickness of 350 μm and a maximum thickness of 525 μm. The entire interlayer film for laminated glass had a wedge-shaped cross section with a minimum thickness of 1560 μm, a maximum thickness of 2010 μm, and a wedge angle θ of 0.45 mrad. The interlayer film for laminated glass was thinnest at one edge and thickest at the other edge. The minimum thickness and maximum thickness were measured by observation using an optical microscope.

The interlayer film was interposed between two transparent float glass plates (1000 mm in length×300 mm in width×2.5 mm in thickness) to prepare a laminate. The laminate was temporarily press-bonded using a heating roll at 230° C. The temporarily press-bonded laminate was press-bonded by a roll heat method using an autoclave under a pressure of 1.2 MPa at 135° C. for 20 minutes, thereby obtaining a laminated glass (1000 mm in length×300 mm in width).

(Production of Laminated Glass for Luminance Measurement)

The interlayer film (thin part) having a length of 10 cm and a width of 10 cm was cut out in a manner the center thereof was 10 cm from one edge and on the line with the minimum distance from the one edge to the other edge. The resulting interlayer film (thin part) was interposed between two transparent float glass plates (5 cm in length×5 cm in width×2.5 mm in thickness) to prepare a laminate. The laminate was temporarily press-bonded using a heating roll at 230° C. The temporarily press-bonded laminate was press-bonded by a roll heat method using an autoclave under a pressure of 1.2 MPa at 135° C. for 20 minutes, thereby obtaining a laminated glass for luminance measurement (5 cm in length×5 cm in width).

EXAMPLES 27 TO 29, COMPARATIVE EXAMPLES 11 and 12

An interlayer film for laminated glass and laminated glass were produced as in Example 26, except that the polyvinyl butyral resin and the light-emitting particles shown in Table 6 were used.

(Evaluation)

The interlayer films for laminated glass and laminated glasses obtained in the examples and comparative examples were evaluated by the methods below. Tables 1 to 6 show the results.

(1) Measurement of the Amount of Nitric Acid-Derived Components or the Like in Interlayer Films for Laminated Glass The amounts of nitric acid-derived components and carbonate components in the interlayer films for laminated glass were measured by the electric conductivity method using an ion chromatograph (ICS-2000) available from Diionex. The details of the measurement procedure are described below.

The laminated glasses obtained in Examples 1 to 29 and Comparative Examples 1 to 12 were each cooled with liquid nitrogen to separate the interlayer film for laminated glass from the glass plates. The separated interlayer film for laminated glass was allowed to stand under 25° C. and 30% humidity for 2 hours.

The layers of laminated glasses obtained in Examples 17 to 29 and Comparative Examples 7 to 12 which included multiple interlayer films for laminated glass were separated by the following procedure. A finger was inserted between the light-emitting layer and the adhesive layer, and these layers were separated from this site at a rate of 1 to 5 cm/s. After separation, the light-emitting layer and the adhesive layer were allowed to stand under 25° C. and 30% humidity for 2 hours. The shape-adjusting layer, first resin layer, sound insulating layer, and second resin layer were separated in the same manner.

A 0.5 cm×0.5 cm sample piece was cut out of each of the light-emitting layer, adhesive layer, shape-adjusting layer, first resin layer, sound insulating layer, and second resin layer, and the samples were weighed. Each sample was dissolved in 45 mL of chloroform, and 50 mL of ion exchange water was added to the solution. The resulting mixture was shaken for 1 hour, followed by standing for phase separation. After the phases were separated, the aqueous phase was extracted as a measurement liquid 1. After the extraction of the aqueous phase, 50 mL of ion exchange water was again added, and the above operation was repeated. The aqueous solution extracted after phase separation was used as a measurement liquid 2. The concentrations of nitric acid-derived components and carbonate components in the measurement liquid 1 and the measurement liquid 2 were determined by the electric conductivity method using ion chromatograph (ICS-2000) available from Diionex. Based on the concentrations of the nitric acid-derived components and carbonate components and the weights of the samples, the amounts of nitric acid-derived components and carbonate components in the light-emitting layer, adhesive layer, shape-adjusting layer, first resin layer, sound insulating layer, and second resin layer were calculated.

(2) Durability Evaluation

The laminated glasses obtained in Examples 1 to 21 and Comparative Examples 1 to 8 each in a size of 5 cm in length×5 cm in width and the laminated glasses for luminance measurement obtained in Examples 22 to 29 and Comparative Examples 9 to 12 were each irradiated with light at an entire face in a dark room. The light was emitted from a high power xenon light source ("REX-250" available from Asahi Spectra Co., Ltd, irradiation wavelength: 405 nm) located 10 cm away from the face of the laminated glass in the perpendicular direction. The initial luminance at 45 degrees to the face of the laminated glass irradiated with light was measured with a luminance meter ("SR-3AR" available from Topcon Technohouse Corporation) disposed at a minimum distance of 35 cm away from the face of the laminated glass on the side at which the light was emitted.

Next, the laminated glasses in a size of 5 cm×5 cm were each irradiated with ultraviolet rays for 1000 hours with a JIS-UV tester (750 W, light source: silica glass mercury lamp). The luminance of the laminated glasses irradiated with ultraviolet rays was measured in the same manner as the measurement of initial luminance. Laminated glasses exhibiting luminance at an intensity of at least 50% that of the initial luminance after ultraviolet irradiation were evaluated as "o (good)", while those exhibiting luminance at an intensity of less than 50% that of the initial luminance after ultraviolet irradiation were evaluated as "x (poor)".

(3) Evaluation of Heat Insulation Properties

The laminated glasses obtained in Examples 13 to 16 were each measured for the transmittance and reflectance of light with a wavelength of 300 to 2500 nm in conformity with ISO 13837 using a spectrophotometer (U-4100 available from Hitachi High-Technologies Corporation), and calculated the Tts from the results.

(4) Evaluation of Penetration Resistance (Measurement of Pummel Value of Interlayer Film for Laminated Glass)

The laminated glasses for evaluation of penetration resistance obtained in Examples 17 to 21 and Comparative Examples 7 and 8 were left standing at −18° C.±0.6° C. for 16 hours. A center portion (150 mm in length×150 mm in width) of each laminated glass was shattered with a hammer having a 0.45 kg head into glass pieces with a size of 6 mm or smaller. Areas of the films from which glass pieces fell off were measured to determine the degree of exposure, and a pummel value was assigned based on the classifications indicated in Table 7.

(5) Evaluation of Double Image

The laminated glasses obtained in Examples 22 to 29 and Comparative Examples 9 to 12 (1000 mm in length×300 mm in width) were each placed at the windshield position. Image information from a display unit disposed below the laminated glass was projected on the laminated glass. Whether double image phenomenon occurred or not was observed with eyes from a predetermined position. The laminated glasses causing no double image phenomenon were evaluated as "o (good)", while the laminated glasses causing double image phenomenon were evaluated as "x (poor)".

TABLE 1

|  |  | Example 1 | Example 2 | Example 3 | Example 4 | Example 5 | Example 6 |
|---|---|---|---|---|---|---|---|
| Resin (PVB) | Type | PVB1-1 | PVB1-1 | PVB1-1 | PVB1-1 | PVB1-2 | PVB1-3 |
|  | phr | 100 | 100 | 100 | 100 | 100 | 100 |
| Plasticizer (3GO) | phr | 40 | 40 | 40 | 40 | 40 | 40 |
| Eu complex | Structure | Eu(TFA)$_3$ phen | Eu(TFA)$_3$ dpphen | Eu(HFA)$_3$ phen | Tb(TFA)$_3$ phen | Eu(HFA)$_3$ phen | Eu(HFA)$_3$ phen |
|  | phr | 0.2 | 0.2 | 0.2 | 0.2 | 0.2 | 0.2 |
| Nitrate component | ppm | 10 | 10 | 10 | 10 | 100 | 0 |
| Carbonate component | ppm | 5 | 5 | 5 | 5 | 0 | 100 |
| Initial light-emitting properties |  | 220 | 210 | 215 | 520 | 200 | 203 |
| Light-emitting properties after durability testing |  | 190 | 180 | 174 | 475 | 137 | 126 |
| Durability evaluation |  | ○ | ○ | ○ | ○ | ○ | ○ |

|  |  | Example 7 | Comparative Example 1 | Comparative Example 2 | Comparative Example 3 | Comparative Example 4 |
|---|---|---|---|---|---|---|
| Resin (PVB) | Type | PVB1-4 | PVB1-5 | PVB1-6 | PVB1-5 | PVB1-5 |
|  | phr | 100 | 100 | 100 | 100 | 100 |
| Plasticizer (3GO) | phr | 40 | 40 | 40 | 40 | 40 |
| Eu complex | Structure | Eu(HFA)$_3$ phen | Eu(TFA)$_3$ dpphen | Eu(TFA)$_3$ dpphen | Eu(HFA)$_3$ phen | Tb(TFA)$_3$ phen |
|  | phr | 0.2 | 0.2 | 0.2 | 0.2 | 0.2 |
| Nitrate component | ppm | 50 | 70 | 100 | 70 | 70 |
| Carbonate component | ppm | 50 | 70 | 100 | 70 | 70 |
| Initial light-emitting properties |  | 202 | 10 | 8 | 9 | 78 |
| Light-emitting properties after durability testing |  | 128 | 1 | 2 | 1 | 26 |
| Durability evaluation |  | ○ | X | X | X | X |

TABLE 2

|  |  | Example 8 | Example 9 | Example 10 | Example 11 | Example 12 | Comparative Example 5 | Comparative Example 6 |
|---|---|---|---|---|---|---|---|---|
| Resin (PVB) | Type | PVB1-1 | PVB1-7 | PVB1-2 | PVB1-1 | PVB1-2 | PVB1-8 | PVB1-8 |
|  | phr | 100 | 100 | 100 | 100 | 100 | 100 | 100 |
| Plasticizer (3GO) | phr | 40 | 40 | 40 | 40 | 40 | 40 | 40 |
| Eu complex | Structure | Eu(HFA)$_3$ phen | Eu(HFA)$_3$ phen | Eu(HFA)$_3$ phen | Eu(HFA)$_3$ phen | Eu(HFA)$_3$ phen | Eu(HFA)$_3$ phen | Eu(HFA)$_3$ phen |
|  | phr | 0.4 | 0.4 | 0.4 | 0.6 | 0.6 | 0.4 | 0.6 |
| Nitrate component | ppm | 10 | 60 | 100 | 10 | 100 | 0 | 0 |
| Carbonate component | ppm | 5 | 0 | 0 | 5 | 0 | 150 | 150 |
| Initial light-emitting properties |  | 440 | 410 | 430 | 720 | 700 | 200 | 330 |
| Light-emitting properties after durability testing |  | 410 | 330 | 290 | 695 | 590 | 53 | 86 |
| Durability evaluation |  | ○ | ○ | ○ | ○ | ○ | X | X |

TABLE 3

|  |  | Example 13 | Example 14 | Example 15 | Example 16 |
|---|---|---|---|---|---|
| Resin (PVB) | Type | PVB1-1 | PVB1-1 | PVB1-1 | PVB1-1 |
|  | phr | 100 | 100 | 100 | 100 |
| Plasticizer (3GO) | phr | 40 | 40 | 40 | 40 |
| Eu complex | Structure | Eu(HFA)$_3$ phen | Eu(HFA)$_3$ phen | Eu(HFA)$_3$ phen | Tb(TFA)$_3$ phen |
|  | phr | 0.2 | 0.2 | 0.2 | 0.2 |
| Heat ray absorber | Type | ITO | CWO | ITO | ITO |
|  | wt % | 0.15 | 0.05 | 0.5 | 0.15 |
| Nitrate component | ppm | 10 | 10 | 10 | 10 |
| Carbonate component | ppm | 5 | 5 | 5 | 5 |
| Initial light-emitting properties |  | 210 | 208 | 207 | 510 |
| Light-emitting properties after durability testing |  | 180 | 178 | 177 | 480 |
| Durability evaluation |  | ○ | ○ | ○ | ○ |
| Heat insulation properties (Tts) |  | 74.9 | 67.4 | 69.6 | 74.5 |

TABLE 4

|  |  |  | | Example 17 | Example 18 | Example 19 | Example 20 | Example 21 | Comparative Example 7 | Comparative Example 8 |
|---|---|---|---|---|---|---|---|---|---|---|
| Light-emitting layer | Resin (PVB) | Type | | PVB1-1 | PVB1-7 | PVB1-2 | PVB1-1 | PVB2-1 | PVB1-5 | PVB2-2 |
| | | phr | | 100 | 100 | 100 | 100 | 100 | 100 | 100 |
| | Plasticizer (3GO) | phr | | 40 | 40 | 40 | 40 | 60 | 40 | 60 |
| | Eu complex | Structure | | Eu(HFA)$_3$ phen | Eu(HFA)$_3$ phen | Eu(HFA)$_3$ phen | Tb(TFA)$_3$ phen | Eu(HFA)$_3$ phen | Eu(HFA)$_3$ phen | Eu(HFA)$_3$ phen |
| | | phr | | 0.5 | 0.5 | 0.5 | 0.5 | 0.5 | 0.5 | 0.5 |
| | | Nitrate component | ppm | 10 | 60 | 100 | 10 | 10 | 70 | 70 |
| | | Carbonate component | ppm | 5 | 0 | 0 | 5 | 5 | 70 | 70 |
| Adhesive layer | Resin (PVB) | Type | | PVB1-9 | PVB1-9 | PVB1-9 | PVB1-9 | PVB1-9 | PVB1-9 | PVB1-9 |
| | | phr | | 100 | 100 | 100 | 100 | 100 | 100 | 100 |
| | Plasticizer (3GO) | phr | | 40 | 40 | 40 | 40 | 40 | 40 | 40 |
| | Nitrate component | ppm | | 0 | 0 | 0 | 0 | 0 | 0 | 0 |
| | Carbonate component | ppm | | 40 | 40 | 40 | 40 | 40 | 40 | 40 |
| Initial light-emitting properties | | | | 70 | 69 | 66 | 160 | 72 | 6 | 9 |
| Light-emitting properties after durability testing | | | | 55 | 51 | 40 | 143 | 58 | 2 | 3 |
| Durability evaluation | | | | ○ | ○ | ○ | ○ | ○ | X | X |
| Pummel | | | | 4 | 4 | 4 | 4 | 4 | 4 | 4 |

TABLE 5

|  |  |  | | Example 22 | Example 23 | Example 24 | Example 25 | Comparative Example 9 | Comparative Example 10 |
|---|---|---|---|---|---|---|---|---|---|
| Composition | Light-emitting layer | Resin (PVB) | Type | PVB1-1 | PVB1-2 | PVB1-1 | PVB1-1 | PVB1-5 | PVB1-5 |
| | | | phr | 100 | 100 | 100 | 100 | 100 | 100 |
| | | Plasticizer (3GO) | phr | 40 | 40 | 40 | 40 | 40 | 40 |
| | | Eu complex | Structure | Eu(HFA)$_3$ phen | Eu(HFA)$_3$ phen | Tb(TFA)$_3$ phen | Eu(HFA)$_3$ phen | Eu(HFA)$_3$ phen | Tb(TFA)$_3$ phen |
| | | | phr | 0.5 | 0.5 | 0.5 | 0.5 | 0.5 | 0.5 |
| | | Nitrate component | ppm | 10 | 100 | 10 | 10 | 70 | 70 |
| | | Carbonate component | ppm | 5 | 0 | 5 | 5 | 70 | 70 |
| | Shape-adjusting layer | Resin (PVB) | Type | PVB1-9 | PVB1-9 | PVB1-9 | PVB1-9 | PVB1-9 | PVB1-9 |
| | | | phr | 100 | 100 | 100 | 100 | 100 | 100 |
| | | Plasticizer (3GO) | phr | 40 | 40 | 40 | 40 | 40 | 40 |
| | | Nitrate component | ppm | 0 | 0 | 0 | 0 | 0 | 0 |
| | | Carbonate component | ppm | 40 | 40 | 40 | 40 | 40 | 40 |
| Shape | Light-emitting layer | Minimum thickness | μm | 100 | 100 | 100 | 100 | 100 | 100 |
| | | Maximum thickness | μm | 200 | 200 | 200 | 200 | 200 | 200 |
| | Thickness etc. of interlayer film | Minimum thickness | μm | 800 | 800 | 800 | 800 | 800 | 800 |
| | | Maximum thickness | μm | 1250 | 1250 | 1250 | 1500 | 1250 | 1250 |
| | | Wedge angle θ | mrad | 0.45 | 0.45 | 0.45 | 0.7 | 0.45 | 0.45 |
| Initial light-emitting properties | | | | 70 | 66 | 155 | 72 | 7 | 36 |
| Light-emitting properties after durability testing | | | | 58 | 51 | 141 | 62 | 2 | 11 |
| Durability evaluation | | | | ○ | ○ | ○ | ○ | X | X |
| Evaluation of occurrence of double image | | | | ○ | ○ | ○ | ○ | ○ | ○ |

TABLE 6

|  |  |  |  | Example 26 | Example 27 | Example 28 |
|---|---|---|---|---|---|---|
| Composition | First resin layer | Resin (PVB) | Type | PVB1-1 | PVB 1-1 | PVB1-1 |
| | | | phr | 100 | 100 | 100 |
| | | Plasticizer (3GO) | phr | 40 | 40 | 40 |
| | | Nitrate component | ppm | 10 | 10 | 10 |
| | | Carbonate component | ppm | 5 | 5 | 5 |
| | Sound insulating layer | Resin (PVB) | Type | PVB2-1 | PVB2-1 | PVB2-1 |
| | | | phr | 100 | 100 | 100 |
| | | Plasticizer (3GO) | phr | 60 | 60 | 60 |
| | | Nitrate component | ppm | 10 | 10 | 10 |
| | | Carbonate component | ppm | 5 | 5 | 5 |
| | Second resin layer | Resin (PVB) | Type | PVB1-1 | PVB1-1 | PVB1-1 |
| | | | phr | 100 | 100 | 100 |
| | | Plasticizer (3GO) | phr | 40 | 40 | 40 |
| | | Nitrate component | ppm | 10 | 10 | 10 |
| | | Carbonate component | ppm | 5 | 5 | 5 |

TABLE 6-continued

|  |  |  |  |  |  |  |
|---|---|---|---|---|---|---|
|  | Light-emitting layer | Resin (PVB) | Type | PVB1-1 | PVB1-2 | PVB1-1 |
|  |  |  | phr | 100 | 100 | 100 |
|  |  | Plasticizer (3GO) | phr | 40 | 40 | 40 |
|  |  | Eu complex | Structure | Eu(HFA)$_3$ phen | Eu(HFA)$_3$ phen | Tb(TFA)$_3$ phen |
|  |  |  | phr | 0.2 | 0.2 | 0.2 |
|  |  | Nitrate component | ppm | 10 | 100 | 10 |
|  |  | Carbonate component | ppm | 5 | 0 | 5 |
| Shape | Structure of interlayer film | — | — | First resin layer/Sound insulating layer/Second resin layer/Light-emitting layer | First resin layer/Sound Insulating layer/Second resin layer/Light-emitting layer | First resin layer/Sound Insulating layer/Second resin layer/Light-emitting layer |
|  | First resin layer | Minimum thickness | μm | 350 | 350 | 350 |
|  |  | Maximum thickness | μm | 525 | 525 | 525 |
|  | Sound insulating layer | Minimum thickness | μm | 100 | 100 | 100 |
|  |  | Maximum thickness | μm | 200 | 200 | 200 |
|  | Second resin layer | Minimum thickness | μm | 350 | 350 | 350 |
|  |  | Maximum thickness | μm | 525 | 525 | 525 |
|  | Light-emitting layer | Thickness | μm | 760 | 760 | 760 |
|  | Thickness etc. of interlayer film | Minimum thickness | μm | 1560 | 1560 | 1560 |
|  |  | Maximum thickness | μm | 2010 | 2010 | 2010 |
|  |  | Wedge angle θ | mrad | 0.45 | 0.45 | 0.45 |
| Initial light-emitting properties |  |  |  | 210 | 190 | 500 |
| Light-emitting properties after durability testing |  |  |  | 180 | 130 | 460 |
| Durability evaluation |  |  |  | ○ | ○ | ○ |
| Evaluation of occurrence of double image |  |  |  | ○ | ○ | ○ |

|  |  |  |  | Example 29 | Comparative Example 11 | Comparative Example 12 |
|---|---|---|---|---|---|---|
| Composition | First resin layer | Resin (PVB) | Type | PVB1-1 | PVB1-1 | PVB1-1 |
|  |  |  | phr | 100 | 100 | 100 |
|  |  | Plasticizer (3GO) | phr | 40 | 40 | 40 |
|  |  | Nitrate component | ppm | 10 | 10 | 10 |
|  |  | Carbonate component | ppm | 5 | 5 | 5 |
|  | Sound insulating layer | Resin (PVB) | Type | PVB2-1 | PVB2-1 | PVB2-1 |
|  |  |  | phr | 100 | 100 | 100 |
|  |  | Plasticizer (3GO) | phr | 60 | 60 | 60 |
|  |  | Nitrate component | ppm | 10 | 10 | 10 |
|  |  | Carbonate component | ppm | 5 | 5 | 5 |
|  | Second resin layer | Resin (PVB) | Type | PVB1-1 | PVB1-1 | PVB1-1 |
|  |  |  | phr | 100 | 100 | 100 |
|  |  | Plasticizer (3GO) | phr | 40 | 40 | 40 |
|  |  | Nitrate component | ppm | 10 | 10 | 10 |
|  |  | Carbonate component | ppm | 5 | 5 | 5 |
|  | Light-emitting layer | Resin (PVB) | Type | PVB1-2 | PVB1-5 | PVB1-5 |
|  |  |  | phr | 100 | 100 | 100 |
|  |  | Plasticizer (3GO) | phr | 40 | 40 | 40 |
|  |  | Eu complex | Structure | Tb(TFA)$_3$ phen | Eu(HFA)$_3$ phen | Tb(TFA)$_3$ phen |
|  |  |  | phr | 0.2 | 0.2 | 0.2 |
|  |  | Nitrate component | ppm | 100 | 70 | 70 |
|  |  | Carbonate component | ppm | 0 | 70 | 70 |
| Shape | Structure of interlayer film | — | — | First resin layer/Sound insulating layer/Second resin layer/Light-emitting layer | First resin layer/Sound insulating layer/Second resin layer/Light-emitting layer | First resin layer/Sound insulating layer/Second resin layer/Light-emitting layer |
|  | First resin layer | Minimum thickness | μm | 350 | 350 | 350 |
|  |  | Maximum thickness | μm | 525 | 525 | 525 |
|  | Sound insulating layer | Minimum thickness | μm | 100 | 100 | 100 |
|  |  | Maximum thickness | μm | 200 | 200 | 200 |
|  | Second resin layer | Minimum thickness | μm | 350 | 350 | 350 |
|  |  | Maximum thickness | μm | 525 | 525 | 525 |
|  | Light-emitting layer | Thickness | μm | 760 | 760 | 760 |
|  | Thickness etc. of interlayer film | Minimum thickness | μm | 1560 | 1560 | 1560 |
|  |  | Maximum thickness | μm | 2010 | 2010 | 2010 |
|  |  | Wedge angle θ | mrad | 0.45 | 0.45 | 0.45 |
| Initial light-emitting properties |  |  |  | 495 | 12 | 71 |
| Light-emitting properties after durability testing |  |  |  | 440 | 2 | 25 |
| Durability evaluation |  |  |  | ○ | X | X |
| Evaluation of occurrence of double image |  |  |  | ○ | ○ | ○ |

TABLE 7

| Degree of exposure of interlayer film (area %) | Pummel value |
|---|---|
| 90 < Degree of exposure ≤100 | 0 |
| 85 < Degree of exposure ≤90 | 1 |
| 60 < Degree of exposure ≤85 | 2 |
| 40 < Degree of exposure ≤60 | 3 |
| 20 < Degree of exposure ≤40 | 4 |
| 10 < Degree of exposure ≤20 | 5 |
| 5 < Degree of exposure ≤10 | 6 |
| 2 < Degree of exposure ≤5 | 7 |
| Degree of exposure ≤2 | 8 |

INDUSTRIAL APPLICABILITY

The present invention can provide an interlayer film for laminated glass capable of displaying images with a high luminous intensity when irradiated with a light beam and having excellent durability, and a laminated glass including the interlayer film for laminated glass.

REFERENCE SIGNS LIST

1: interlayer film for laminated glass
11: light-emitting layer
12: shape-adjusting layer
2: interlayer film for laminated glass
21: light-emitting layer
22: shape-adjusting layer
23: shape-adjusting layer
3: interlayer film for laminated glass
31: light-emitting layer
32: shape-adjusting layer
33: shape-adjusting layer

The invention claimed is:

1. An interlayer film for laminated glass, comprising:
    a light-emitting layer containing a polyvinyl acetal resin and a lanthanoid complex as light-emitting particles, the light-emitting layer containing not more than 100 ppm in total of a nitric acid-derived component and a carbonate component,
    wherein the lanthanoid complex is $Eu(TFA)_3phen$, $Eu(TFA)_3dpphen$, $Eu(HFA)_3phen$, $[Eu(FOD)_3]bpy$, $[Eu(TFA)_3]tmphen$ or $[Eu(FOD)_3]phen$.

2. A laminated glass comprising:
    two transparent plates; and
    the interlayer film for laminated glass according to claim 1 interposed between the transparent plates.

* * * * *